(12) United States Patent
Lamplmair et al.

(10) Patent No.: US 12,086,291 B2
(45) Date of Patent: Sep. 10, 2024

(54) APPARATUS AND METHOD FOR CHECKING THE INTEGRITY OF SENSOR-DATA STREAMS

(71) Applicant: Tributech Solutions GmbH, Linz (AT)

(72) Inventors: Patrick Lamplmair, Linz (AT); Simon Pfeifhofer, Axams (AT); Thomas Plank, Alberndorf (AT)

(73) Assignee: Tributech Solutions GmbH, Linz (AT)

( * ) Notice: Subject to any disclaimer, the term of this patent is extended or adjusted under 35 U.S.C. 154(b) by 313 days.

(21) Appl. No.: 17/600,781

(22) PCT Filed: Mar. 18, 2020

(86) PCT No.: PCT/AT2020/060108
§ 371 (c)(1),
(2) Date: Oct. 1, 2021

(87) PCT Pub. No.: WO2020/198770
PCT Pub. Date: Oct. 8, 2020

(65) Prior Publication Data
US 2022/0179998 A1    Jun. 9, 2022

(30) Foreign Application Priority Data
Apr. 3, 2019    (AT) .............................. A 50291/2019

(51) Int. Cl.
*G06F 21/64*    (2013.01)
*H04L 9/32*    (2006.01)
*H04L 9/40*    (2022.01)

(52) U.S. Cl.
CPC ............ *G06F 21/64* (2013.01); *H04L 9/3236* (2013.01); *H04L 63/123* (2013.01)

(58) Field of Classification Search
CPC ...... G06F 21/64; H04L 9/3236; H04L 63/123
See application file for complete search history.

(56) References Cited

U.S. PATENT DOCUMENTS

| 6,959,384 B1 | 10/2005 | Serret-Avila |
| 9,111,120 B2 | 8/2015 | Feller et al. |

(Continued)

FOREIGN PATENT DOCUMENTS

| EP | 2437186 A1 | 4/2012 |
| WO | 2016/049077 A1 | 3/2016 |
| WO | 2019/020194 A1 | 1/2019 |

OTHER PUBLICATIONS

Koo, D.; Shin, Y.; Yun, J.; Hur, J. Improving Security and Reliability in Merkle Tree-Based Online Data Authentication with Leakage Resilience. Appl. Sci. 2018, 8, 2532. https://doi.org/10.3390/app8122532.*

*Primary Examiner* — Matthew T Henning
(74) *Attorney, Agent, or Firm* — Tiajoloff & Kelly LLP

(57) ABSTRACT

An apparatus for checking the integrity of sensor-data streams (15) with a detection unit (1) having a sensor-data input. Individual sensor-data stream sections (11, 12, 13, 14) of a sensor-data stream (15) can also be checked for integrity independently of further processing in existing infrastructures (26), in particular in the case of transmission across a plurality of infrastructure nodes, with low resource consumption. The detection unit (1) comprises a control device (4), connected to the sensor-data input and to a hash tree memory (5), calculating and storing hash values on the basis of individual sensor-data stream sections (11, 12, 13, 14) and on the basis of subordinate hash values of the hash tree, and having a root hash output (19) outputting the most recently calculated root hash value.

10 Claims, 3 Drawing Sheets

(56) References Cited

U.S. PATENT DOCUMENTS

Figure 1:
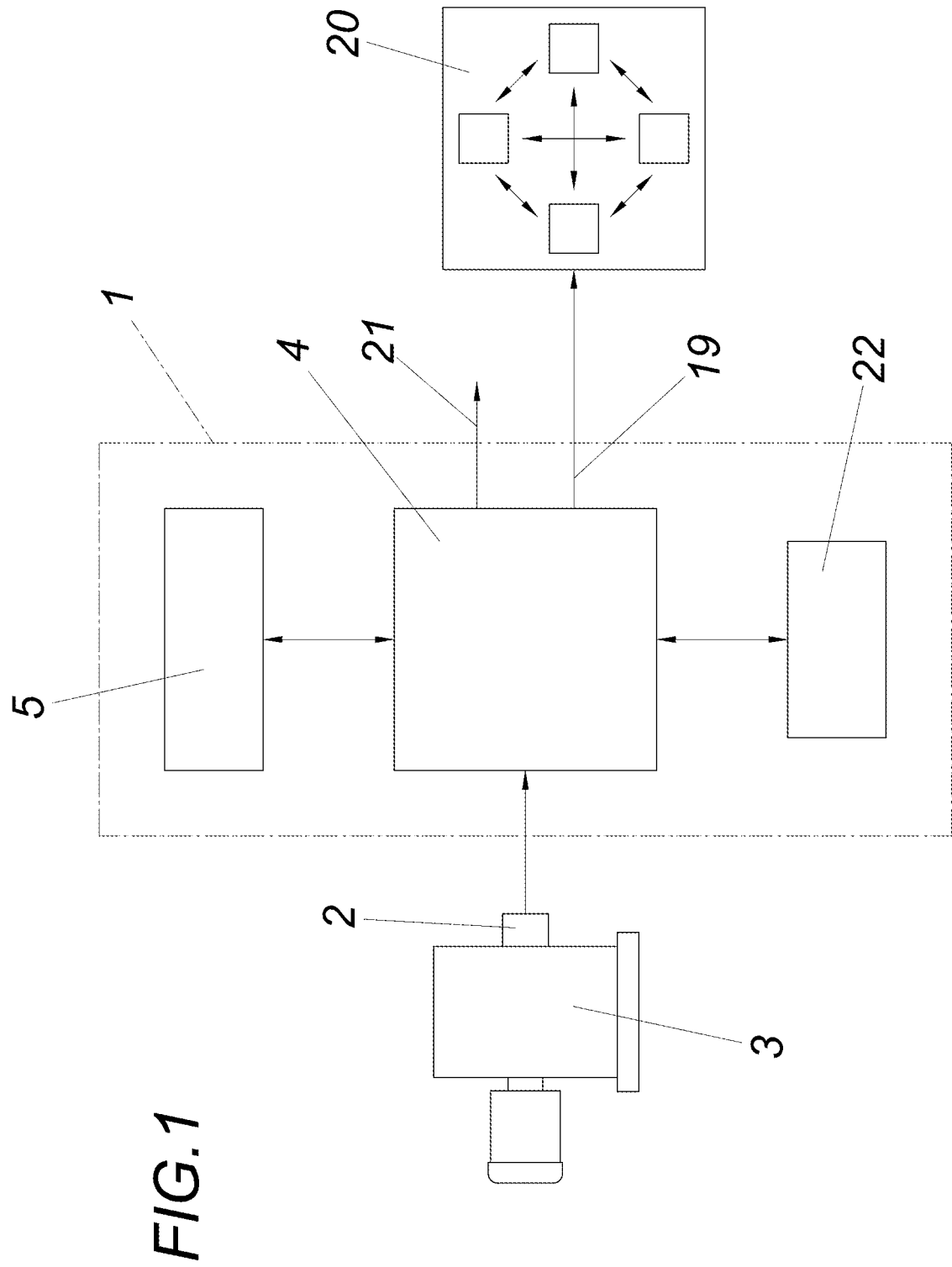

| | | |
|---|---|---|
| 2005/0063545 A1* | 3/2005 | Fujimoto .............. H04L 9/3236 |
| | | 713/176 |
| 2005/0114666 A1 | 5/2005 | Sudia |
| 2005/0235154 A1 | 10/2005 | Serret-Avila |
| 2012/0084569 A1 | 4/2012 | Feller et al. |
| 2013/0243189 A1 | 9/2013 | Ekberg et al. |
| 2015/0189005 A1 | 7/2015 | Dubois et al. |
| 2019/0044726 A1 | 2/2019 | Macieira et al. |
| 2021/0089683 A1* | 3/2021 | Hemlin Billstrom ........................ |
| | | H04L 9/3239 |

\* cited by examiner

APPARATUS AND METHOD FOR CHECKING THE INTEGRITY OF SENSOR-DATA STREAMS

FIELD OF THE INVENTION

The invention relates to an apparatus and method for checking the integrity of sensor-data streams comprising a detection unit having a sensor-data input.

DESCRIPTION OF THE PRIOR ART

To check the integrity of sensor data, i.e. to verify the correct content, the unmodified state and the temporal correctness of the sensor data, encryption or transport via secure environments is conventionally used (US 20130243189 A1) to prevent the sensor data from being manipulated during transmission. The disadvantage of this, however, is that such encryption methods are not only resource-intensive, but also that the available sensor data can no longer be processed in plain text in existing infrastructures, which makes their use more difficult, especially in the field of monitoring and controlling vehicle components or industrial machines.

In addition, to secure the encryption parameters used as well as to speed up the processing procedures, it has already been proposed (WO 2016049077 A1) to use Trusted Platform Modules (TPM).

However, a disadvantage of all known apparatuses and methods is that the protection by encryption of the sensor-data streams requires an intervention in the existing transmission infrastructure and that the cryptographic functions used are so complex, not least for security reasons, that they do not achieve the required processing rates in low-power embedded systems, which would allow comprehensive distribution to accommodate many different sensor-data streams with different clock frequencies.

In addition, especially in the case of sensor-data streams, not only the integrity check of individual sensor-data stream sections in the form of data packets, but also the integrity check of the sensor-data stream sections in relation to the sensor-data stream should be enabled, so that it can be checked whether a sensor-data stream section has actually occurred at the specified position of a sensor-data stream, no sensor-data stream sections have been added or omitted before or after, and the data of the sensor-data stream section itself has not been changed.

SUMMARY OF THE INVENTION

The invention is thus based on the object of designing an apparatus and a method of the type described at the beginning in such a way that individual sensor-data stream sections of a sensor-data stream can also be checked for their integrity independently of further processing in existing infrastructures, in particular in the case of transmission across several infrastructure nodes, with low resource consumption.

The invention solves the posed problem in that the detection unit comprises a control device connected to the sensor-data input and to a hash tree memory for calculating and storing hash values on the basis of individual sensor-data stream sections as well as on the basis of subordinate hash values of the hash tree, and in that the control device comprises a root hash output for outputting the most recently calculated root hash value. As a result of these measures, hash values can be calculated for individual sensor-data stream sections of the sensor-data stream and stored in the lowest level memory regions of a hash tree memory with a predetermined structure, for example in the form of a simple binary tree. When all hash values immediately subordinate to a parent memory region are available, a superordinate hash value can then be calculated from these and stored in the parent memory region, after which the subordinate hash values are no longer required and can thus be deleted for low memory consumption. During operation, it is thus not necessary to keep all the hash values of a hash tree in the hash tree memory, but only those required to compute a superordinate hash value in the hash tree at a time. If the root hash value of a hash tree of a given structure has been calculated in this way, it can be output via the root hash output and then deleted from the hash tree memory. In this way, the clock frequency or data rate of the sensor-data stream to be acquired can be achieved by adjusting in particular the depth of the hash tree even at low power of the control device. For example, with a binary hash tree at a depth of 1-10 levels, sensor-data streams with simple numerical values could be acquired with clock frequencies of 1 Hz, while at a depth of 10-27 levels, clock frequencies of up to 50,000 Hz could be acquired. Finally, according to the invention, in the case where successive root hash values are formed from temporally successive and non-overlapping sensor-data stream sections, the entire hash tree memory need not be used at any time, so that the size of the memory can be correspondingly small, which also reduces the access times to such a memory. If one accepts a larger memory region, the further advantage arises that the calculation of the hash values for a subsequent sensor-data stream section can already be started, while the hash values of the preceding sensor-data stream section is not yet completed, but the deeper levels of the hash tree memory are no longer occupied.

In order to be able to verify the authenticity of the sensor-data stream in addition to the integrity, it is proposed that the control device is connected to a cryptographic key store uniquely assigned to the control device for electronically signing the root hash values. The signature of the outputted root hash value thus made possible makes it possible to subsequently verify, for example via a public key infrastructure, whether a root hash value was outputted by a specific control device and thus also by a specific detection unit. Because the detection unit can be spatially and structurally close to the sensor generating the sensor-data stream due to the low power requirements, the possibility of falsification of the authenticity is thus significantly impeded. Furthermore, due to the fact that for an authenticity check only the root hash value needs to be signed in each case, but not the individual sensor-data stream sections, a correspondingly runtime-intensive signature method can be used despite the low performance requirements on the detection unit, which also makes falsification of real-time data in particular unlikely. A key store can be, for example, a secure or trusted runtime environment such as a Trusted Platform Module (TPM) to which the root hash value for the signature is transmitted and from which the signature can be retrieved without the private part of the cryptographic key used for this purpose leaving the key store.

For tamper-proof storage of the root hash values and for simple transmission and interrogation of the same for checking the integrity, the root hash output of the control device can be connected to a consensus-based, decentralized and addressable check memory. Accordingly, the root hash values themselves are not transmitted in the fundamentally manipulable sensor-data stream, but only their address as a reference to a memory region in the check memory which, due to its decentralized, consensus-based design, cannot be manipulated by a single attacker or can be manipulated only with great effort. In order to facilitate the synchronization of the hash tree calculation between the detection unit and an interrogation unit described below, it is proposed that the address of the root hash value in the check memory is output together with a reference to the sensor-data sections used for the calculation of the root hash value. For this purpose, the control device may comprise a sensor-data output for outputting the sensor-data stream sections and the addresses of the root hash values in the check memory together with a reference to the sensor-data sections used for calculating the root hash value. In a particularly advantageous embodiment, if the addresses of the root hash values are inserted between sensor-data stream sections that respectively mark the end or the beginning of a hash tree, a separate reference to the sensor-data sections used for the calculation of the root hash value may be omitted. Particularly simple transmission and testing conditions are obtained if, in addition to a reference to the sensor-data sections used for the calculation of the root hash value, information about the structure of the hash tree, in particular about its depth and the method used for hash formation, is output together with the sensor-data stream sections, because then the structure of the hash tree, just like the method for hash formation, can be adapted to the current parameters of the sensor-data stream, such as the data transmission rate, for example, and no separate transmission has to take place for the transmission of these calculation parameters.

To enable sensor-data stream sections to be checked for integrity independently of the detection unit, an interrogation unit may be provided in accordance with the invention, which comprises a sensor-data input for sensor-data stream sections and a control device connected to the sensor-data input and a hash tree memory for calculating and storing hash values on the basis of individual sensor-data stream sections as well as on the basis of subordinate hash values of the hash tree, wherein the control device is connected to the consensus-based, decentralized and addressable check memory for querying root hash values. In this context, the control device and the hash tree memory can be constructed in the same way as those of the detection unit, so that in principle no calculation parameters, i.e. information for calculating the hash values as well as for the structure of the hash tree, need to be transmitted from the detection unit to the interrogation unit. If, for example, different hash tree structures or methods for calculating the hash values are to be used in order to adapt to the clock frequency of the sensor-data streams, a central administration unit can be provided in which these calculation parameters can be stored for each sensor-data stream or each detection unit and can be retrieved by the interrogation units. As described above, however, these calculation parameters can also be integrated directly into the data stream together with the addresses of the root hash values in the check memory.

In a particularly preferred embodiment of the invention, it is possible not only to interrogate data stream sections with a time offset and to subject them to an integrity check, but also to check a plurality of data stream sections with respect to their integrity, from which no complete hash tree can be formed per se and thus no root hash value can be calculated. This can be achieved in that the detection unit is connected to a data memory for recording sensor-data stream sections, which comprises a control device connected to a hash tree memory for calculating and storing hash values based on individual sensor-data stream sections as well as based on subordinate hash values of the hash tree. Thus, an interrogation unit may query not only the immediate real-time output from a detection unit, but any data stream sections from said data memory. If no complete hash trees can be formed from the interrogated data stream sections, the control device of the data memory, which can be constructed analogously to the control device of the detection unit and thus also of the interrogation unit, calculates the intermediate hash values in the hash tree which are closest to the root hash value in each case and which cannot be calculated by the interrogation unit on the basis of the interrogated data stream sections, and transmits these to the interrogation unit together with the queried data stream sections. The control device of the interrogation unit can then store these intermediate hash values in the hash tree memory and in this way determine the root hash value based on the transmitted sensor-data stream sections. If data stream sections not transmitted to the interrogation unit have been tampered with in the process, the data memory will transmit erroneous intermediate hash values to the interrogation unit, where the integrity check will also fail as described above. This has the advantage that manipulations before or after the queried data stream sections can also be detected, which also call into question the integrity of the queried data stream sections.

The invention also relates to a method for operating an apparatus of the type described, wherein hash values are calculated for individual sensor-data stream sections of a sensor-data stream and stored in the memory regions of the lowest level of a hash tree memory with a predetermined structure, wherein, when all hash values directly subordinate to a parent memory region are available, a superordinate intermediate hash value is calculated from these and stored in the parent memory region, after which the subordinate hash values are deleted. This method is repeated until a root hash value of the hash tree has been computed, which can be output for verification. To check the integrity of the sensor-data stream, the entire method is repeated and the resulting check root hash value is compared to the originally output root hash value. If the check root hash value and the originally output root hash value match, the integrity check is successful; if the check root hash value and the originally output root hash value do not match, the integrity check fails.

To prevent consistent sensor data occurring over a long period of time from leading to predictable root hash values, it is proposed that the individual sensor-data stream segments be provided with a timestamp that is taken into account when calculating the hash value.

As mentioned above, each newly computed root hash value of a hash tree can be provided with an electronic signature identifying the detection unit, which, in addition to verifying the integrity of the sensor-data sections, also enables verification of the origin of the sensor-data sections.

Finally, as discussed in more detail above, the verification of sensor-data sections is facilitated if each newly computed root hash value of a hash tree is stored in a consensus-based, decentralized verification memory and the address of the root hash value is output in the verification memory along with a reference to the computation parameters comprising the sensor-data sections used to compute the root hash value.

For checking the integrity, the address of the root hash value can be extracted from the sensor-data stream together with the calculation parameters, the root hash value stored at this address can be retrieved, and a check root hash value can be determined for comparison based on the sensor-data sections of the sensor-data stream and the calculation parameters. Alternatively, the calculation parameters can also be queried by an administration unit.

If the determined check root hash value matches the called root hash value, the integrity check is successful. If the check root hash value does not match the called root hash value or if no root hash value was found at the specified address, the integrity check fails. In the case of a root hash value with an electronic signature, you can also check whether the signature matches the specifications stored in the administration unit, for example.

BRIEF DESCRIPTION OF THE INVENTION

Figure 2:
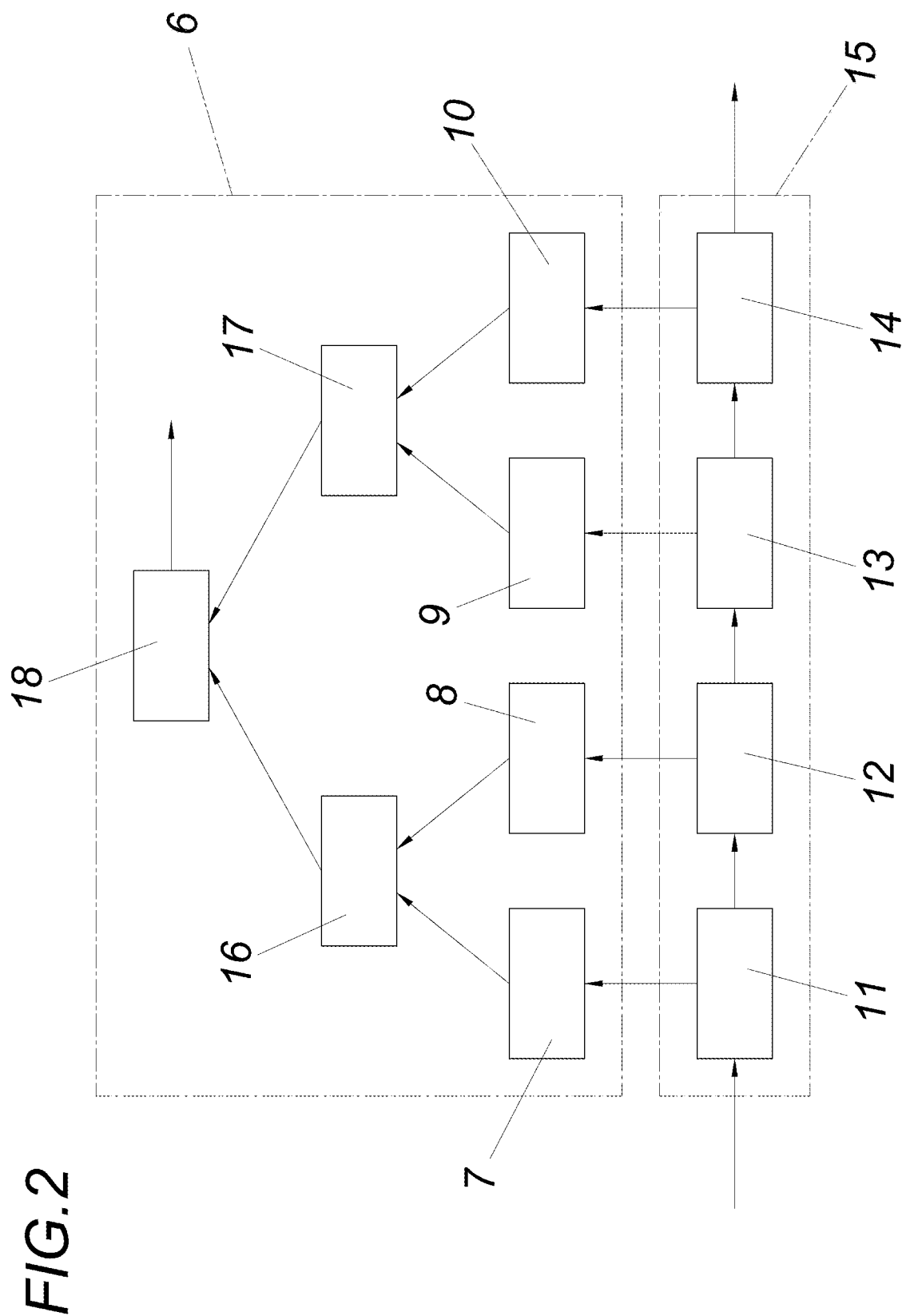
Figure 3:
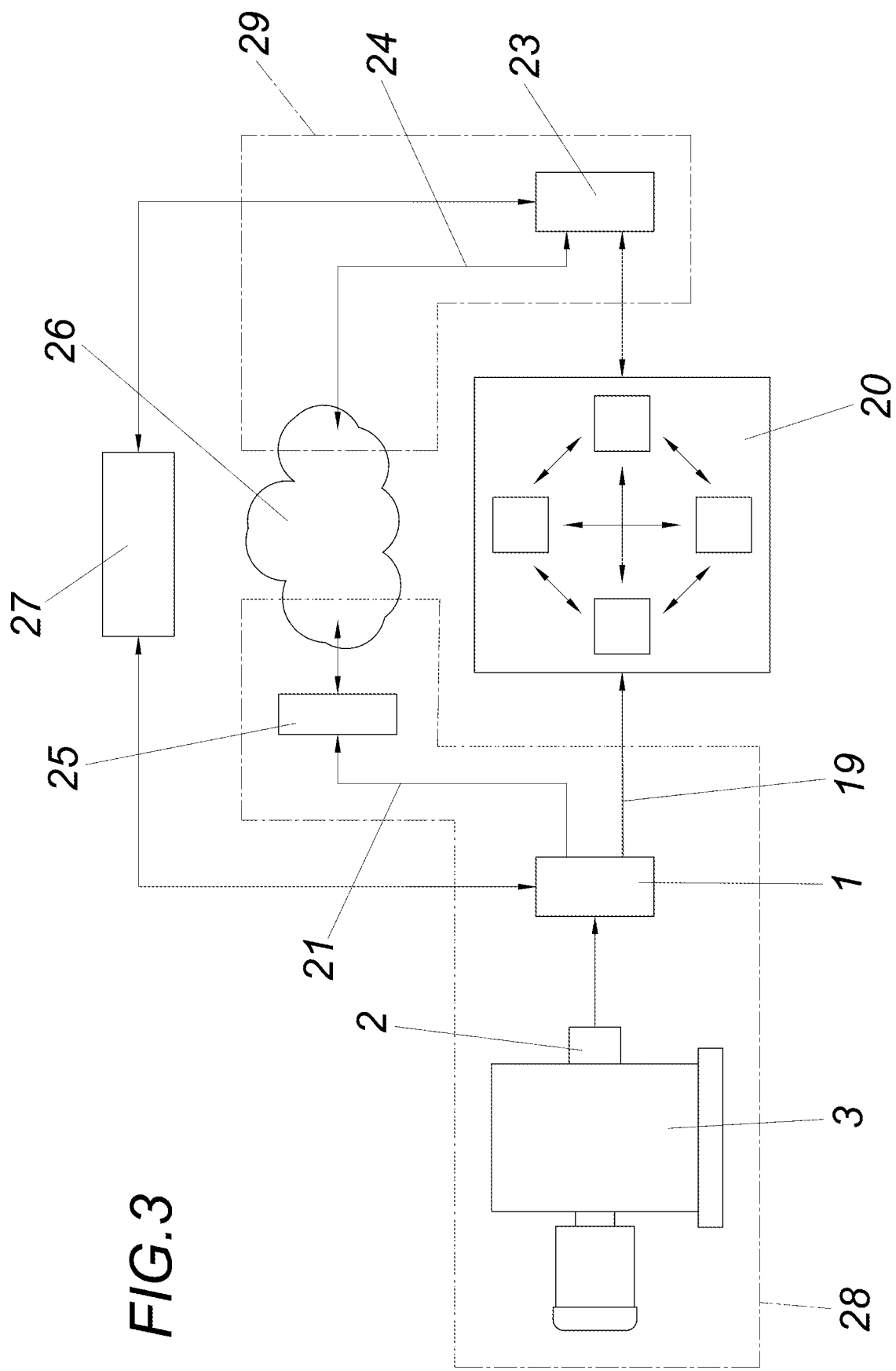

In the drawing, the subject matter of the invention is shown by way of example, wherein:

FIG. 1 shows a schematic representation of a detection unit according to the invention, FIG. 2 shows a memory structure, also shown schematically, of a hash tree memory of such a detection unit, and FIG. 3 shows a device according to the invention with a detection unit of FIG. 1, also in a schematic representation on a larger scale.

DETAILED DESCRIPTION OF THE PREFERRED EMBODIMENTS

An apparatus according to the invention for checking the integrity of sensor-data streams comprises a detection unit 1, by means of which the sensor data of a sensor 2 can be acquired. The sensor 2 may, for example, be arranged on a machine 3 and measure its temperature or similar parameters. The detection unit 1 itself comprises, in addition to a control device 4, a hash tree memory 5.

The memory structure within the hash tree memory 5 is explained in more detail below with reference to FIG. 2: In the present embodiment, the hash tree is in the form of a simple binary hash tree 6. This binary hash tree 6 has respective individual memory regions 7, 8, 9, 10 into which hash values of sensor-data stream sections 11, 12, 13, 14 of a sensor-data stream 15 can be stored. The memory regions 7 and 8 are associated with a superordinate parent memory region 16 for an intermediate hash, and the memory regions 9 and 10 are associated with a superordinate parent memory region 17 for an intermediate hash. The memory regions 16 and 17 are in turn associated with a superordinate parent memory region 18 into which the root hash value of the binary hash tree 6 may be stored.

As a result of these measures, hash values can be calculated for individual sensor-data stream sections 11, 12, 13, 14 of the sensor-data stream and stored in the memory regions 7, 8, 9, 10 of the lowest level of a hash tree memory 5 with a predetermined structure, for example in the form of a simple binary tree 6. When all hash values directly subordinate to a parent memory region 16, 17 are available, a superordinate hash value can then be calculated from these and stored in the parent memory region 16, 17, after which the subordinate hash values are no longer required and the memory regions 7, 8, 9, 19 can thus be deleted for low memory consumption. In this regard, the hash values for the parent memory regions 16 and 17 may be computed either in parallel or sequentially, with the latter approach enabling the erasure of memory regions 7 and 8 independently of the erasure of memory regions 9 and 10. Finally, when the intermediate hash values in the parent memory regions 16 and 17 are available, a superordinate root hash value is also computed and stored in the parent memory region 18. Thereafter, in turn, the parent memory regions 16 and 17 may be cleared. It can thus be seen from FIG. 2 that, in principle, all sensor-data stream sections 11, 12, 13, 14 of the sensor-data stream 15 are required to compute a complete hash tree. However, the hash tree can also be calculated if, for example, the intermediate hash value of the parent memory region 17 is present in addition to the sensor-data stream sections 11, 12 or if the intermediate hash value of the parent memory region 16 is present in addition to the sensor-data stream sections 13, 14.

For outputting the most recently calculated root hash value in each case, the control device 4 of the detection unit 1 has a root hash output 19 which can be connected to a symbolically illustrated, consensus-based, decentralized and addressable check memory 20 for securely storing the root hash values, as illustrated in FIGS. 1 and 3.

In addition to the root hash output 19, the control device 4 may also include a sensor-data output 21 for outputting the sensor-data stream sections 11, 12, 13, 14 and the addresses of the root hash values in the check memory 20 together with a reference to the sensor-data sections used to calculate the root hash value.

In a particularly preferred embodiment of the invention, the detection unit 1 comprises a cryptographic key memory 22 uniquely associated with the control device 4 for electronically signing the root hash values.

In addition to the detection unit 1, an interrogation unit 23 may also be provided comprising a sensor-data input 24 for sensor-data stream sections 11, 12, 13, 14 and a control device, which is not shown in closer detail and which is connected to the sensor-data input 24 and to a hash tree memory, which is also not shown in closer detail, for calculating and storing hash values on the basis of individual sensor-data stream sections and on the basis of subordinate hash values of the hash tree. The structure of the interrogation unit 23 may therefore correspond to the structure of the detection unit 1. Furthermore, the control device of the interrogation unit 23 is connected to the consensus-based, decentralized and addressable check memory 20 for interrogating root hash values.

In order not only to interrogate sensor-data stream sections 11, 12, 13, 14 with a time offset and to subject them to an integrity check, but also to check the integrity of a plurality of sensor-data stream sections 13, 14 from which no complete hash tree can be formed and thus no root hash value can be calculated, it is proposed in accordance with the invention that the detection unit 1 is connected to a data memory 25 for recording sensor-data stream sections 11, 12, 13, 14. This data memory 25 also comprises a control device, not shown, connected to a hash tree memory for calculating and storing hash values based on individual sensor-data stream sections 11, 12, 13, 14 as well as based on subordinate hash values of the hash tree. Thus, apart from a memory region for the sensor-data stream sections 11, 12, 13, 14, the data memory 25 may also be structured analogously to the detection unit 1.

The transmission of the sensor-data stream sections 11, 12, 13, 14 from the detection unit 1 to the interrogation unit 23 can in principle take place via any infrastructure 26, including unsecured infrastructure 26, for example via the Internet. In this context, the calculation parameters for determining the hash values and for the structure of the hash trees to be used can be predefined in advance, integrated into the sensor-data stream or else predefined or interrogated via an administration unit 27 provided for this purpose.

As can be seen in particular from FIG. 3, the apparatus according to the invention and the method according to the invention thus enable a sensor-data stream measured by a sensor 2 to be detected via a detection unit 1 in a first security domain 28 and to be interrogated via an interrogation unit 23 in a second security domain 29 via an insecure infrastructure 26, wherein the sensor data can be received and further processed in plain text, but a modification of the sensor data causes the integrity check on the part of the interrogation unit 23 to fail. Furthermore, it is not only possible to interrogate the sensor-data stream from the sensor 2 in real time, but also to interrogate any recorded sensor-data stream sections 11, 12 from the data storage 25 with integrity checking.

The invention claimed is:

1. A method for checking integrity of sensor-data streams, said method comprising:
    calculating hash values for individual temporally successive sensor-data stream sections of a sensor-data stream; and
    storing said hash values in memory regions of a lowest level of a hash tree memory with a predetermined structure;
    when all of the hash values directly subordinate to a parent memory region are available, calculating a superordinate hash value from said hash values;
    storing the superordinate hash value in the parent memory region; and
    after storing the superordinate hash value, deleting from said hash tree memory said hash values subordinate to the parent memory region while preserving the superordinate hash value therein, wherein the deleting of the hash values of an earlier of the sensor data stream sections from the hash tree memory is performed prior to the storing of the hash values of a later of the sensor data stream sections in the hash tree memory.

2. The method according to claim 1, wherein the individual sensor-data stream sections are each provided with a respective time stamp, and the calculating of the respective hash value for each of the individual sensor-data stream sections uses the time stamp.

3. The method according to claim 1, wherein each newly calculated root hash value of a hash tree is provided with an electronic signature identifying a detection unit.

4. The method according to claim 1, wherein each newly calculated root hash value of a hash tree is stored in a consensus-based, decentralized check memory with an address associated therewith, and the address of the root hash value in the check memory is output together with a reference to calculation parameters comprising sensor-data sections used for the calculation of the root hash value.

5. The method according to claim 4, wherein the address of the root hash value is extracted together with the calculation parameters from the sensor-data stream, the root hash value stored at said address is retrieved, and a check root hash value is determined for comparison on the basis of the sensor-data sections of the sensor-data stream and the calculation parameters.

6. An apparatus carrying out a method according to claim 1, said apparatus comprising a detection unit that comprises a sensor-data input, wherein the detection unit includes a control device connected to the sensor-data input and to a hash tree memory, said control device calculating and storing hash values based on individual sensor-data stream sections and on subordinate hash values of the hash tree, and wherein the control device has a root hash output outputting a most recently calculated root hash value.

7. The apparatus according to claim 6, wherein the control device is connected to a cryptographic key memory uniquely associated with the control device so as to electronically sign the root hash values.

8. The apparatus according to claim 6, wherein the root hash output of the control device is connected to a consensus-based, decentralized and addressable check memory, and wherein the control device includes a sensor-data output outputting the sensor-data stream sections and addresses of the root hash values in the check memory.

9. The apparatus according to claim 8, wherein an interrogation unit comprises a sensor-data input for sensor-data stream sections and the control device is connected to the sensor-data input and to a hash tree memory, said control device calculating and storing hash values based on the individual sensor-data stream sections and on subordinate hash values of the hash tree, and wherein the control device is connected to the consensus-based, decentralized and addressable check memory and queries the root hash values therefrom.

10. The apparatus according to claim 6, wherein the detection unit is connected to a data memory recording sensor-data stream sections, the control device being connected to the hash tree memory and calculating and storing hash values based on the individual sensor-data stream sections and on the subordinate hash values of the hash tree.

* * * * *